(12) United States Patent
Kawanishi

(10) Patent No.: US 12,153,122 B2
(45) Date of Patent: Nov. 26, 2024

(54) FOREIGN-OBJECT DETECTION SYSTEM

(71) Applicant: WASEDA UNIVERSITY, Tokyo (JP)

(72) Inventor: Tetsuya Kawanishi, Tokyo (JP)

(73) Assignee: Waseda University, Tokyo (JP)

( * ) Notice: Subject to any disclaimer, the term of this patent is extended or adjusted under 35 U.S.C. 154(b) by 378 days.

(21) Appl. No.: 17/563,062

(22) Filed: Dec. 28, 2021

(65) Prior Publication Data

US 2022/0283291 A1    Sep. 8, 2022

Related U.S. Application Data

(63) Continuation of application No. PCT/JP2020/025025, filed on Jun. 25, 2020.

(30) Foreign Application Priority Data

Jun. 28, 2019  (JP) ................ 2019-121580

(51) Int. Cl.
*G01S 13/10* (2006.01)
*G01S 13/32* (2006.01)
(Continued)

(52) U.S. Cl.
CPC .......... *G01S 13/872* (2013.01); *G01S 13/10* (2013.01); *G01S 13/32* (2013.01); *G01S 13/343* (2013.01); *G01S 13/345* (2013.01); *G01S 13/934* (2020.01)

(58) Field of Classification Search
CPC .......... G01S 13/10; G01S 13/32; G01S 13/34; G01S 13/343; G01S 13/345; G01S 13/87;
(Continued)

(56) References Cited

U.S. PATENT DOCUMENTS

| 2016/0223645 | A1* | 8/2016 | Kim ............... | G01S 13/345 |
| 2018/0024233 | A1* | 1/2018 | Searcy ............ | G01S 13/003 |
| | | | | 342/125 |
| 2020/0025866 | A1* | 1/2020 | Gulati ............ | G01S 13/931 |

FOREIGN PATENT DOCUMENTS

JP        58-189570 A      11/1983
JP        2012-107947 A    6/2012
(Continued)

OTHER PUBLICATIONS

International Search Report of International Patent Application No. PCT/JP2020/025025 completed Aug. 26, 2020 and mailed Sep. 8, 2020 ( 4 pages).

(Continued)

*Primary Examiner* — Timothy A Brainard
(74) *Attorney, Agent, or Firm* — Pyprus Pte Ltd; George D. Liu

(57) ABSTRACT

To provide a foreign-object system which uses a plurality of radars, and which can detect a foreign object that is present on a runway or the like and which can suppress interference between radars. A foreign-object detection system including a first radar 11, a second radar 21 connected to the first radar via a network 33, and a signal source 31 for transmitting a synchronization signal to the first radar and the second radar via the network, said foreign-object detection system wherein interference generated due to a radar signal outputted from the second radar being reflected by a reflective body and inputted to the first radar is prevented by controlling a delay time that corresponds to $|\tau_{1i}-\tau_{2j}|$, where $\tau_{1i}$ is the time taken for the synchronization signal to be transmitted from the signal source to the first radar, and $\tau_{2j}$ is the time taken for the synchronization signal to be transmitted from the signal source to the second radar.

5 Claims, 4 Drawing Sheets

(51) Int. Cl.
   *G01S 13/34*    (2006.01)
   *G01S 13/87*    (2006.01)
   *G01S 13/934*   (2020.01)
(58) Field of Classification Search
   CPC ............... G01S 13/872; G01S 13/934; G01S 2013/916; G01S 7/0235
   See application file for complete search history.

(56) References Cited

FOREIGN PATENT DOCUMENTS

| | | | |
|---|---|---|---|
| JP | 2012-193998 | A | 10/2012 |
| JP | 2017-3453 | A | 1/2017 |
| JP | 2019-055769 | A | 4/2019 |

OTHER PUBLICATIONS

Written Opinion of International Patent Application No. PCT/JP2020/025025 completed Aug. 26, 2020 and mailed Sep. 8, 2020 (5 pages).

* cited by examiner

FOREIGN-OBJECT DETECTION SYSTEM

CROSS-REFERENCE TO RELATED APPLICATIONS

This application is a continuation application of International Application No. PCT/JP2020/025025, filed Jun. 25, 2020, which claims the benefit of Japanese Patent Application No. 2019-121580, filed Jun. 28, 2019, the contents of which are hereby incorporated by reference in their entirety.

TECHNICAL FIELD

The present invention relates to a foreign object detection system using a plurality of radars. More specifically, the present invention relates to a foreign object detection system using radars capable of suppressing interference between the radars.

BACKGROUND ART

Japanese Unexamined Patent Application Publication No. 2019-055769 describes a system and method for detecting an obstacle in an aerial system. The system described in this publication has a radar mounted on an airplane to detect an obstacle during a flight. The radar described in this publication scans a first airspace in a radial direction.

The radar described in Japanese Unexamined Patent Application Publication No. 2019-055769 is suitable for detecting an obstacle in the sky. However, since the radar described in this publication scans the first airspace in the radial direction, it is difficult to detect a foreign object or obstacle existing in a runway or the like.

CITATION LIST

Patent Documents

[Patent Document 1] Japanese Unexamined Patent Application Publication No. 2019-055769

SUMMARY OF INVENTION

Problems to be Solved by the Invention

An object of one of the inventions described herein is to provide a foreign object detection system using a plurality of radars, capable of detecting a foreign object existing in a runway and suppressing interference between the radars.

Means for Solving the Problems

One of the inventions described herein is based on the following findings. When detecting a foreign object using a plurality of radars connected via a network, a false image may occur due to an interference wave between radars. The position where such a false image occurs depends on a difference (delay amount) of the signal arrival time of each radar. Therefore, it is possible to discriminate the false image and effectively suppress the interference between the radars by controlling this delay amount.

One of the inventions described herein relates to a foreign object detection system 1. This foreign object detection system 1 includes a first radar 11, a second radar 21, and a signal source 31. The second radar 21 is connected to the first radar 11 via a network 33. The signal source 31 is an element connected to the first radar 11 and the second radar 21 via the network 33 to transmit a synchronization signal.

Assume that $\tau_{1i}$ denotes time for transmitting the synchronization signal from the signal source 31 to the first radar 11, and $\tau_{2j}$ denotes time for transmitting the synchronization signal from the signal source 31 to the second radar 21.

In addition, the signal source 31 controls a delay time corresponding to $|\tau_{1i}-\tau_{2j}|$. As a result, the foreign object detection system 1 can prevent interference occurring when a radar signal output from the second radar 21 is reflected by a reflective object 37 and input to the first radar 11.

As a preferable example of the foreign object detection system 1, the first radar 11 and the second radar 21 are provided on the ground.

As a preferable example of the foreign object detection system 1, $|\tau_{1i}-\tau_{2j}|$ is controlled in consideration of $L_m$, where $L_m$ denotes a measurement limit length of the first radar 11. Specifically, $|\tau_{1i}-\tau_{2j}|$ is controlled so as to satisfy $|\tau_{1i}-\tau_{2j}|>2L_m/c$ (where c denotes a signal velocity).

As a preferable example, the foreign object detection system 1 has a delay time change unit 41 configured to change the delay time, a changing target identifying unit 43 configured to identify a measurement target whose position measured by the first radar 11 changes when the delay time change unit changes the delay time, and an interference determination unit 45 configured to determine that the measurement target identified by the changing target identifying unit is interference.

As a preferable example of the foreign object detection system 1, the first radar and the second radar are pulse radars and satisfy the following formula (3):

$$t_{max} \leq \mathrm{mod}(\Delta\tau_{ij}, T) \qquad (3),$$

where $t_{max}$ is equal to $2L_{max}/c$, $L_{max}$ denotes a maximum detection distance of the first radar and the second radar, c denotes a signal velocity, $\Delta\tau_{ij}$ is equal to $|\tau_{1i}-\tau_{2j}|$, and T denotes a period of the pulse radar.

As a preferable example of the foreign object detection system (1), the first radar and the second radar are FMCW radars whose frequencies change in a triangular wave shape with respect to time, and satisfy the following formula (4):

$$f_{max} < (2f_B \times \mathrm{mod}(\Delta\tau_{ij}, T))/T < 2f_B - f_{max} \qquad (4),$$

where $f_{max}$ denotes an upper limit frequency (Hz) of an IF band circuit of the FMCW radar, $f_B$ denotes a frequency sweep width (Hz) of the FMCW radar, $\Delta\tau_{ij}$ is equal to $|\tau_{1i}-\tau_{2j}|$, and T denotes a period of the FMCW radar.

As a preferable example of the foreign object detection system (1), the first radar and the second radar are FMCW radars whose frequency change in a saw tooth shape with respect to time, and satisfy the following formula (5):

$$f_{max} < (f_B \times \mathrm{mod}(\Delta\tau_{ij}, T))/T < f_B - f_{max} \qquad (5),$$

where $f_{max}$ denotes an upper limit frequency (Hz) of the IF band circuit of the FMCW radar, $f_B$ denotes a frequency sweep width (Hz) of the FMCW radar, $\Delta\tau_{ij}$ is equal to $|\tau_{1i}-\tau_{2j}|$, and T denotes a period of the FMCW radar.

Advantageous Effects

According to the invention described above, it is possible to provide a foreign object detection system capable of effectively preventing interference between radars by controlling time for the signal arrival time of each radar.

DESCRIPTION OF EMBODIMENTS

Embodiments for carrying out the present invention will now be described with reference to the accompanying drawings. The present invention is not limited to the forms described below, but also includes those modified appropriately by a person skilled in the art from the forms described below.

Figure 1:
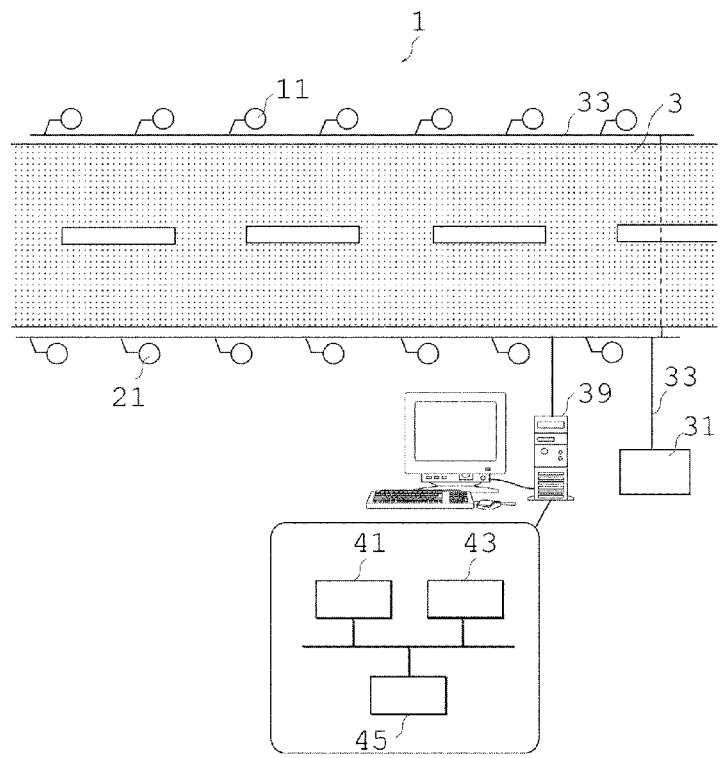
FIG. 1 is a conceptual diagram illustrating a configuration example of a foreign object detection system.

FIG. 1 is a conceptual diagram illustrating a configuration example of a foreign object detection system. As shown in FIG. 1, the foreign object detection system 1 includes a first radar 11, a second radar 21, and a signal source 31. The second radar 21 is connected to the first radar 11 via a network 33. The signal source 31 is an element connected to the first radar 11 and the second radar 21 via the network 33 to transmit a synchronization signal.

The foreign object detection system 1 is, for example, a system for detecting a foreign object existing in an airplane runway 3. The foreign object is, for example, an object that does not exist on the runway in a normal condition, such as an obstacle that hinders operation of an airplane, and means an object that hinders or may hinder safe operation of the airplane. In the aircraft example, a foreign object exists on the runway. That is, the foreign object is generally an object that exists in an area that a vehicle may pass through during normal operation. The description will now be made by focusing on the foreign object detection system of the airplane runway. Naturally, the foreign object detection system 1 may also be employed for various purposes, such as a foreign object detection system on the road and a foreign object detection system in a voyage. This system may also be provided on the road to notify an autonomous vehicle of presence of a foreign object.

As the first radar 11 and the second radar 21, any radar known in the art may be employed as appropriate. The radars may receive a synchronization signal (for example, an optical signal), convert the received synchronization signal into a radio signal by using a signal converter or generate a signal by using a transmitter synchronized with the synchronization signal, and emit the radio signal from the radio output unit. In addition, the radars may receive a radio signal by using a radio receiver unit, convert the received radio signal into a signal (for example, an optical signal) by using a signal conversion unit, and output it from a receive signal output unit.

The radar may be a continuous wave (FMCW) radar or a pulse radar. The FMCW radar may calculate a distance between a radar and a foreign object by inputting the transmitted wave and the received wave to a mixer in an analysis device and measuring a frequency difference therebetween. A fiber optic technology may be employed to superimpose the radio signals on the optical fiber. In this case, the synchronization signal is obtained by modulating the light by the radar signal waveform itself. As the synchronization signal, an intermediate frequency band waveform existing in the middle of the radar signal waveform generation process may be used. The synchronization signal transmitted to a plurality of radars is synchronized, so that the timing can be adjusted. The fiber radio unit and the fiber radio system are well known in the art as disclosed in Japanese Patent Application Publication (Translation of PCT Application) No. 2010/001438. The signal source may generate and output the synchronization signal using such a well-known system.

As shown in FIG. 1, it is preferable that the radars are installed at predetermined intervals on both edge sides of the runway. In this case, a radar group may exist near the runway by avoiding a part where the airplane slides. For example, a radar group (first radar group) existing on one edge side of the runway is referred to as $RAU_{1j}$ (where j denotes 1, 2, . . . ), and a radar group (second radar group) existing on the other side of the runway is referred to as $RAU_{2i}$ (where i denotes 1, 2, . . . ). The radar is installed in a vehicle (such as an airplane, car, motorcycle, bicycle, helicopter, and drone) in some cases. Meanwhile, according to the present invention, as shown in FIG. 1, it is preferable that the first radar 11 and the second radar 21 are provided on the ground. Preferably, the first radar 11 and the second radar 21 are provided on each of both edge sides of the runway. In other words, it is preferable that the runway is interposed between the first radar 11 and the second radar 21. The radar distance between each group may be set to, for example, 1 m or longer and 5 km or shorter, 10 m or longer and 1 km or shorter, 100 m or longer and 1 km or shorter, 200 m or longer and 1 km or shorter, or 10 m or longer and 100 m or shorter.

The signal source 31 is an element connected to the first radar 11 and the second radar 21 via the network 33 to transmit a synchronization signal. The synchronization signal output from the signal source 31 arrives at the first radar 11 and the second radar 21 via the network 33, and a radar signal based on the synchronization signal is output from the first radar 11 and the second radar 21.

The network 33 is, for example, an optical fiber network. Each element connected to the optical fiber network may exchange information via the optical fiber. Any element known in the art, such as a router and an amplifier, may be appropriately installed in the optical fiber network.

Figure 2:
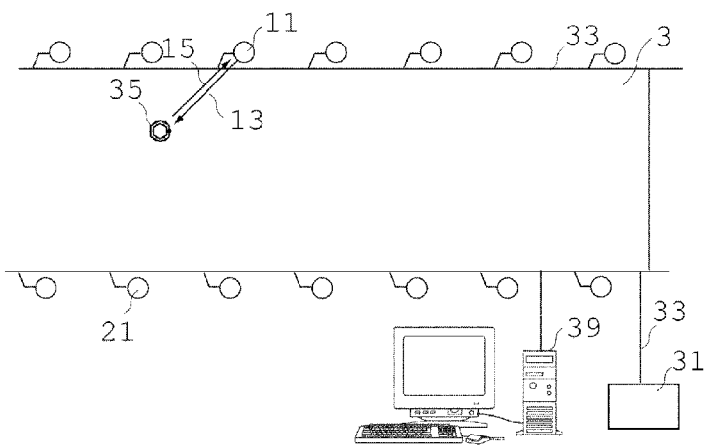
FIG. 2 is a conceptual diagram illustrating how a foreign object is detected.

FIG. 2 is a conceptual diagram illustrating how a foreign object is detected. For example, the radio signal 13 output from the first radar 11 collides with the foreign object 35. Then, the radio signal is reflected by the foreign object 35. The reflected radio signal 15 (or a part thereof) returns to the first radar 11. The first radar 11 receives the radio signal 15 reflected and returned by the foreign object 35. Then, the first radar 11 appropriately converts the received radio signal and outputs it as a detection signal. An analysis device (which may be provided in the same device as that of the signal source) 39 connected to the network receives the detection signal propagating through the network. Then, the analysis device 39 analyzes the received detection signal. The velocity of the radio signal is stored in the memory unit. Then, the analysis device can obtain the distance from the first radar to the foreign object on the basis of, for example, the time at which the first radar outputs the radar signal and the time at which the first radar receives the radio signal 15. Since a plurality of radars exist in this system, it is possible to obtain distances from each radar to the foreign object. Then, the position of the foreign object (for example, the position of the foreign object on the runway) can be obtained by using the position information on a plurality of radars and the information on the distances from each radar to the foreign object.

Figure 3:
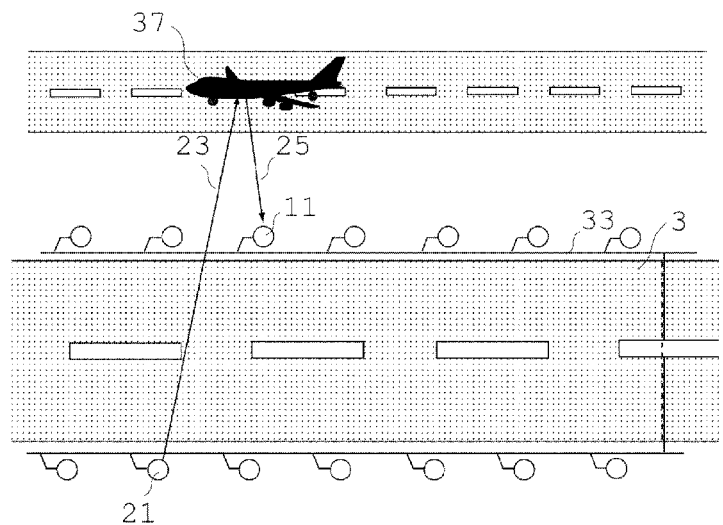
FIG. 3 is a conceptual diagram for explaining how interference occurs by a radio signal from the other radar.

FIG. 3 is a conceptual diagram for explaining how interference occurs by a radio signal from the other radar. In this example, interference occurs on the basis of a radio signal from the other radar because of existence of the reflective object 37. The reflective object 37 does not affect normal operation of the vehicle, and the system may misrecognize the radio signal from the radar reflected by this object. For example, an aircraft 37 may stand by outside the runway. Then, for example, the radio signal 23 from the second radar 21 may be reflected on the aircraft 37, and the reflected radio signal 25 may arrive at the first radar 11. Then, depending on the timing at which the radio signal 25 arrives at the first radar, this signal arrives at the first radar 11 as if the radio signal output from the first radar 11 is reflected and returned by the foreign object 35. Then, the analysis device 39 may determine that a foreign object exists. In this case, the first radar 11 observes a false image as if there is a foreign object. Since the signal reflected from this foreign object is received by a plurality of radars as a signal whose distance is not accurate, it is difficult to recognize the position of the foreign object, and it is expected that the system will be confused. Meanwhile, for example, consider a case where the optical path length from the signal source 31 to the first radar 11 is maintained, and the optical path length from the signal source 31 to the second radar 21 changes. Then, if the signal received by the first radar is originated from the foreign object, the timing of receiving the signal originated from the foreign object does not change because the optical path length of the first radar does not change. Meanwhile, for the signal output from the second radar 21, reflected by the reflective object 37, and received by the first radar 11, the timing of receiving the signal changes as the optical path length from the signal source 31 to the second radar 21 changes. Then, the first radar receives the signal as if the distance of the false image from the first radar changes. In other words, by changing the difference between the timings at which a radar to be observed and the other radar receive the optical signal, it is possible to determine whether the receive signal is originated from a false image or a foreign object.

Assume that $\tau_{1i}$ denotes time taken for transmitting the synchronization signal from the signal source 31 to the first radar 11. In addition, assume that $\tau_{2j}$ denotes time taken for transmitting the synchronization signal from the signal source 31 to the second radar 21. In addition, the signal source 31 controls the delay time corresponding to $|\tau_{1i}-\tau_{2j}|$. As a result, the foreign object detection system 1 can prevent interference caused by the radar signal output from the second radar 21, reflected by the reflective object 37, and input to the first radar 11. For example, if the distance of the object observed from the first radar 11 or the second radar 21 changes when the delay time changes, it is determined that the signal is not originated from the foreign object 35 but from reflective object 37, so that the processing may not be performed as if a foreign object exists.

When the radio signal output from the second radar 21 is directly received by the first radar, it is possible to prevent interference by adjusting the output timing of the radio signal between the first radar and the second radar. That is, the positions of each radar, the distance from one radar to the other radar, and the timings of the radio signals output from each radar are stored in the memory unit of the analysis device. The memory unit also stores a velocity of the radio signal. For this reason, when the one radar receives a radio signal, the time taken for the radio signal to arrive at the one radar from the other radar is obtained by using the distance from that radar to the other radar and the velocity of the radio signal. Using information on the time at which the radio signals are emitted from the one radar and the other radar, it is possible to analyze whether the radio signal received by the one radar is transmitted from the other radar and directly received by the one radar.

Figure 4:
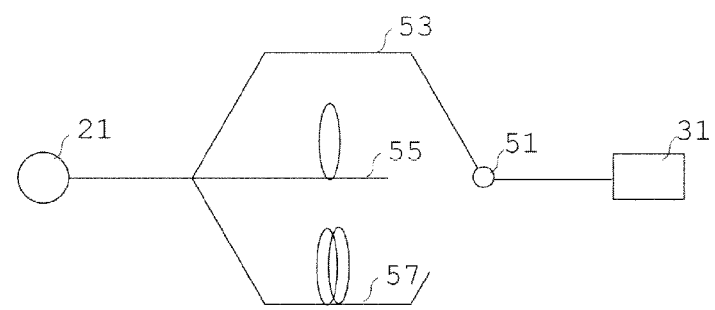
FIG. 4 is a conceptual diagram illustrating an example of a delay time control system of a signal source.

FIG. 4 is a conceptual diagram illustrating an example of the delay time control system in the signal source. This delay time control system is a combination of the optical switch 51 and a plurality of types of delay lines 53, 55, and 57. Since each of the delay lines 53, 55, and 57 has, for example, a different length, the time necessary for the optical signal to pass through is different. For this reason, by selecting the delay lines 53, 55, and 57 by using the optical switch 51, it is possible to control the time for the synchronization signal to arrive at the second radar 21. The aforementioned example is an example of delay control. For example, the delay time may be controlled by changing an external force (for example, pressure or temperature) applied to the optical fiber to change the refractive index of the core, so as to change the velocity of the synchronization signal propagating through the optical fiber.

As a preferable example of the foreign object detection system 1 described above, $|\tau_{1i}-\tau_{2j}|$ is controlled in consideration of $L_m$, where $L_m$ denotes a measurement limit length of the first radar 11. Specifically, $|\tau_{1i}-\tau_{2j}|$ is controlled so as to satisfy $|\tau_{1i}-\tau_{2j}|>2L_m/c$ (where c denotes a signal velocity). The signal velocity means a velocity of the radio signal output from the radar. For example, the distance l1 from the signal source 31 to the first radar 11 (for example, $l_1$ may change due to switching in some cases) and the distance $l_2$ from the signal source 31 to the second radar (for example, $l_2$ may change due to switching) are controlled such that $|\tau_{1i}-\tau_{2j}|>2L_m/c$ is satisfied in consideration of the propagation velocity of the synchronization signal in the network. As a result, it is possible to effectively prevent interference of the optical signal.

A preferable example of the foreign object detection system 1 described above has a delay time change unit 41 that changes the delay time, a changing target identifying unit 43 that identifies a measurement target whose position measured by the first radar 11 changes when the delay time change unit changes the delay time, and an interference determination unit 45 that determines the measurement target identified by the changing target identifying unit is interference. These elements may also be included in the analysis device described above. This analysis device is based on, for example, a computer. An example of the delay time change unit 41 may be obtained by changing the delay lines 53, 55, and 57 to which the optical switch 51 is connected in response to a command of the analysis device.

The computer has an input unit, an output unit, a control unit, an arithmetic unit, and a memory unit, and each element is connected via a bus or the like such that information can be exchanged. For example, the memory unit may store a control program or various types of information. When predetermined information is input from the input unit, the control unit reads the control program stored in the memory unit. In addition, the control unit reads the information stored in the memory unit as appropriate and transmits it to the arithmetic unit. Furthermore, the control unit transmits the input information to the arithmetic unit as appropriate. The arithmetic unit performs an arithmetic processing using various received information and stores it in the memory unit. The control unit reads the operation result stored in the memory unit and outputs it from the output unit. In this manner, various processings are executed.

Figure 5:
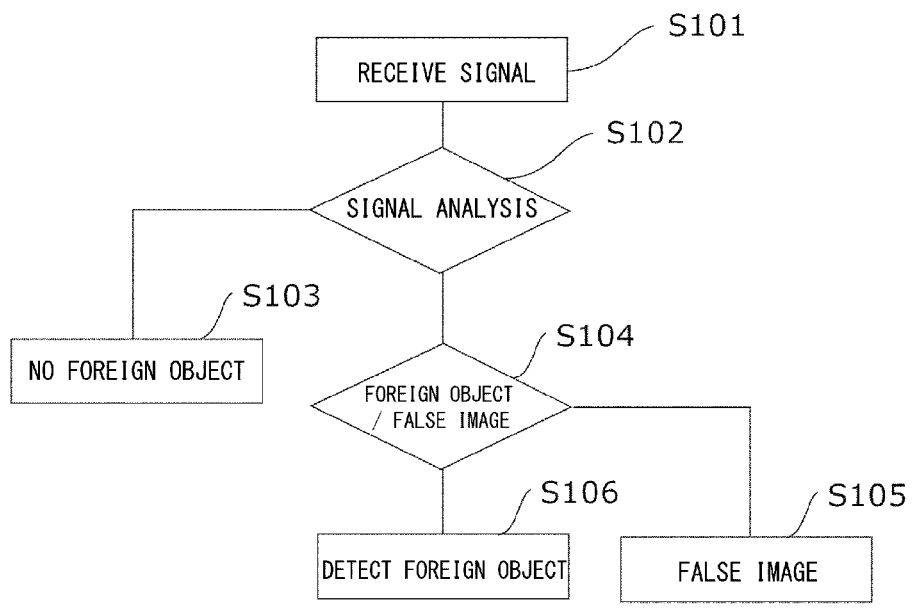
FIG. 5 is an exemplary flowchart for determining whether the signal detected by the foreign object detection system is originated from a foreign object or a reflector.

FIG. 5 is an exemplary flowchart illustrating determination of the foreign object detection system on whether the detected signal is originated from a foreign object or a reflector. In the example of FIG. 5, the first radar receives the radio signal (S101).

The analysis device analyzes whether or not the receive signal is a radio signal output from the other radar and directly delivered to the first radar (S102). The distance from the first radar to the other radar, the propagation timing of the synchronization signal from the signal source to the first radar, and the propagation timing to the other radar are stored in the memory unit of the analysis device. For this reason, the analysis device may read the aforementioned timing information stored in the memory unit and analyzes whether the signal received by the first radar is a radio signal output from the other radar and directly delivered to the first radar.

If the analysis device determines that the radio signal delivered to the first radar is the radio signal output from the other radar and directly delivered to the first radar (S103), a foreign object is not detected.

If the analysis device determines that the radio signal delivered to the first radar is not the radio signal output from the other radar and directly delivered to the first radar, it is determined whether the radio signal is a signal originated from the foreign object 35 or a false image originated from the reflective object 37 (S104). In this case, for example, a difference between the optical path length from the signal source to the first radar and the optical path length from the signal source to the other radar changes. As a specific example, the delay time change unit 41 issues a command to the optical switch 35 to change the delay path, so as to change the optical path length from the signal source 31 to a specific radar. Then, it is analyzed whether or not the distance of the detected target object from the first radar changes. The computer, for example, monitors the distance from the first radar of the target object (candidate for a foreign object) on the basis of the signal from the first radar, and stores it in the memory unit. In addition, as described above, the distance from the first radar to the target object after changing the distance from the signal source to the other radar is obtained and stored in the memory unit. Then, the analysis device reads the distances from the first radar to the target object before and after changing the delay time from the memory unit, and compares them. If the distance from the first radar to the target object changes, and if the change matches the change obtained from the change of the delay time, it is determined that the receive signal is caused by interference. It is determined that the measurement target whose position measured by the first radar 11 changes is a reflective object. In addition, if the distance from the first radar to the target object does not change, it is determined that the target object is a foreign object.

That is, when the distance of the target object changes (S105), the detection signal is analyzed as a signal originated from the reflective object 37. Meanwhile, when the distance of the target object detected from the first radar does not change (S106), the detection signal is analyzed as a signal originated from the foreign object 35. When the analysis device analyzes that the signal is originated from the foreign object 35, the position of the foreign object is obtained by using the information on the distance to the foreign object observed by the other radar and the information on positions of each radar. In addition, an alert is output as appropriate to call attention.

1. Positional Relationship between Plurality of Radars and Signal Delay

Assume that $RAU_{ij}$ denotes the j-th remote antenna unit (radar) on the first line, and $RAU_{2i}$ denotes the i-th remote antenna unit (radar) on the second line. In addition, assume that $\tau_{ij}$ and $\tau_{2i}$ denote deviations from the reference time of the radar wave emitted from $RAU_{1j}$ and $RAU_{2i}$, respectively, and $L_{ij}$ denotes a distance between $RAU_{1j}$ and $RAU_{2i}$.

The time necessary for the radar signal to arrive at $RAU_{2i}$ via RAU is expressed as $L_{ij}/c$, where c denotes a velocity of the radio wave. A difference between the time taken for the synchronization signal output from the signal source to arrive at $RAU_{2i}$ and the time taken for the synchronization signal output from the signal source to be output as a radar signal via $RAU_{1j}$ and arrive at $RAU_{2i}$ is expressed as $|\tau_{2i}-\tau_{1j}+L_{ij}/c|\equiv \Delta t_{ij}$ in consideration of a timing deviation of the synchronization signal.

Meanwhile, a difference between the time taken for the synchronization signal output from the signal source to arrive at $RAU_{1j}$ and the time taken for the synchronization signal output from the signal source to be output as a radar signal via $RAU_{2i}$ and arrive at $RAU_{1j}$ is similarly expressed as $|\tau_{1j}-\tau_{2i}+L_{ij}/c|\equiv \Delta \tau_{ji}$.

2. In Regard to Pulse Radar

Consider a case where a pulse wave is used as the radar signal. Assume that T (seconds) denotes a period of the pulse wave (that is, a repetition cycle of the radar transmission wave), $L_{max}$ denotes a maximum detection distance of the radar, and c denotes a velocity of the radio signal (radar signal). In addition, $t_{max}$ is set to $2L_{max}/c$.

Then, if the following condition is satisfied, the interference signal is out of a time range for measuring the radar signal, so that influence of the interference can be suppressed, $$t_{max} < \Delta t_{ij} < T \qquad (1) \text{ and}$$

$$t_{max} + NT < \Delta t_{ij} < T(N+1) \qquad (2),$$

(where N denotes an integer).

From the formulas (1) and (2), the following condition is derived:

$$t_{max} < \mathrm{mod}(\Delta t_{ij}, T) \qquad (3),$$

where mod(A, B) denotes a remainder of A divided by B, and T denotes a period of the pulse radar.

$L_p$ denotes, for example, a specific integer multiple such as 3 times, 5 times, or 10 times of $L_{max}$.

Then, it is preferable to adjust $\tau_{1j}$ and $\tau_{2i}$ so as to satisfy the formula (3) for (i, j) having a range of $L_{ij} < L_p$. This relationship applies not only between two radars in different radar groups, but also between two radars in the same radar group.

When $RAU_{1j}$ and $RAU_{2i}$ are connected to the network, $\tau_{2i} = L_{2i} \times n/c_1$ (where $L_{2i}$ is an optical path length from the signal source, n denotes an effective refractive index of the network (for example, 1.5 in the case of optical fiber), and $c_1$ denotes the velocity of light). As described above, $\tau_{2i}$ or the delay time can be adjusted by adjusting the fiber length.

3. FMCW Radar

Next, a case where an FMCW radar whose frequency changes in a triangular wave shape with respect to time is used as a radar will be described.

Figure 6:
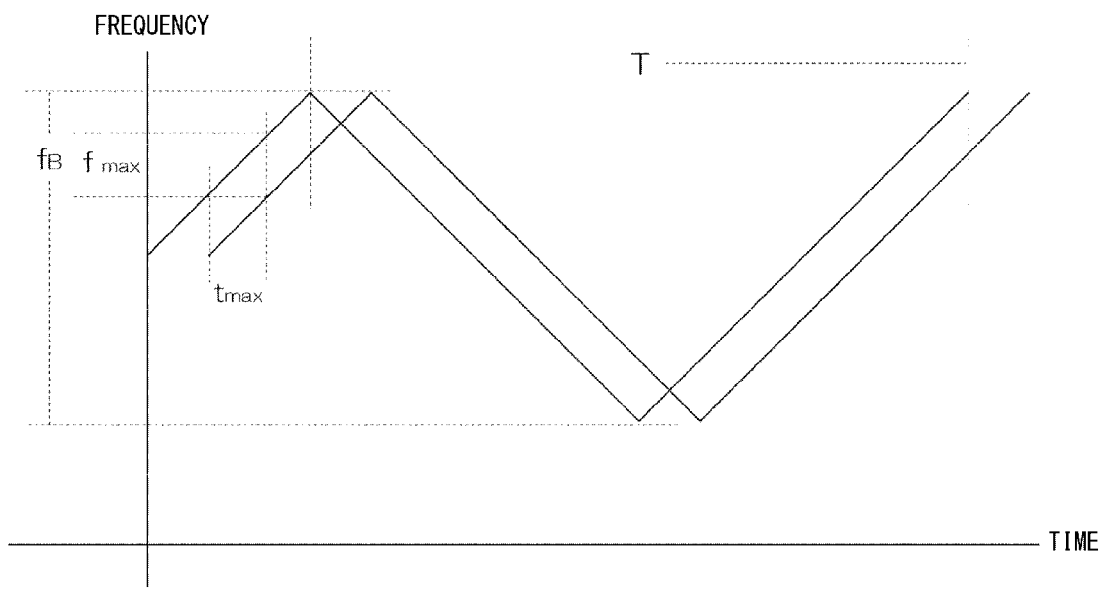
FIG. 6 is a conceptual diagram illustrating a relationship between a transmit signal and a receive signal when an FMCW radar whose frequency changes in a triangular wave shape with respect to time is used as a radar.

FIG. 6 is a conceptual diagram illustrating a relationship between the transmit signal and the receive signal when an FMCW radar whose frequency changes in a triangular wave shape with respect to time is used as the radar. The frequency changing in a triangular wave shape with respect to time means that the radar frequency value changes with respect to time and becomes a triangular wave shape assuming that the abscissa refers to time and the ordinate refers to frequency.

T denotes a period (seconds) of the FMCW radar. $f_B$ denotes a frequency sweep width (Hz) of the FMCW radar. $f_{max}$ denotes an upper limit frequency (Hz) of an IF band circuit of the FMCW radar. The IF band circuit is a circuit for amplifying a component having the lowest frequency out of the output obtained by multiplying the transmitted radar signal and the received radar signal by a mixer (a difference frequency component between the transmit signal and the receive signal). $t_{max}$ is synonymous with that described above. Then, $f_{max}/t_{max}$ is equal to $2f_B/T$. Therefore, for the FMCW radar, if $\Delta\tau_{ij}$ is adjusted to satisfy the following formula (4), the signal caused by interference becomes a component exceeding the upper limit frequency of the IF band circuit, so that its influence can be suppressed.

$$f_{max} < (2f_B \times \mathrm{mod}(\Delta\tau_{ij}, T))/T < 2f_B - f_{max} \quad (4)$$

Next, a case where the FMCW radar whose frequency changes in a saw tooth shape with respect to time is used as a radar will be described.

Figure 7:
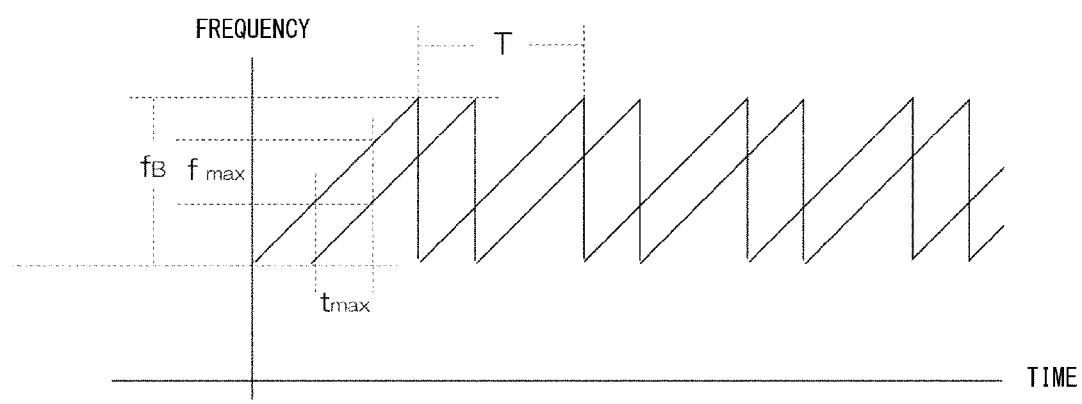
FIG. 7 is a conceptual diagram illustrating a relationship between a transmit signal and a receive signal when an FMCW radar whose frequency changes in a saw tooth shape with respect to time is used as a radar.

FIG. 7 is a conceptual diagram illustrating a relationship between the transmit signal and the receive signal when the FMCW radar whose frequency changes in a saw tooth shape with respect to time is used as a radar.

The first radar and the second radar are FMCW radars whose frequencies change in a saw tooth shape with respect to time, and satisfy the following formula (5):

$$f_{max} < (f_B \times \mathrm{mod}(\Delta\tau_{ij}, T))/T < f_B - f_{max} \quad (5),$$

where $f_{max}$ denotes an upper limit frequency (Hz) of the IF band circuit of the FMCW radar, $f_B$ denotes a frequency sweep width (Hz) of the FMCW radar, $\Delta t_{ij}$ is equal to $|\tau_{1i} - \tau_{2j}|$, and T denotes a period of the FMCW radar.

INDUSTRIAL APPLICABILITY

The invention described herein relates to a foreign object detection system, and can be employed, for example, in the information and communication industry and the construction industry.

REFERENCE SIGNS LIST 1 foreign object detection system
11 first radar
21 second radar
31 signal source
33 network
35 foreign object
37 reflective object
39 analysis device
41 delay time change unit
43 changing target identifying unit
45 interference determination unit
51 optical switch
53, 55, 57 delay line

The invention claimed is:

1. A foreign object detection system comprising:
a first radar;
a second radar connected to the first radar via a network; and
a signal source, which is different from the first radar and the second radar, configured to transmit a synchronization signal to the first radar and the second radar via the network, wherein
$\tau_{1i}$ denotes time for transmitting the synchronization signal from the signal source to the first radar,
$\tau_{2j}$ denotes time for transmitting the synchronization signal from the signal source to the second radar, and
the foreign object detection system controls a delay time corresponding to $|\tau_{1i} - \tau_{2j}|$ to prevent an interference occurring due to input of a radar signal to the first radar, the radar signal being output from the second radar and reflected by a reflective object,
wherein the first radar and the second radar are provided on the ground, and wherein $|\tau_{1i} - \tau_{2j}|$ is controlled so as to satisfy $|\tau_{1i} - \tau_{2j}| > 2L_m/c$ (where c denotes a signal velocity and $L_m$ denotes a measurement limit length of the first radar).

2. A foreign object detection system comprising:
a first radar;
a second radar connected to the first radar via a network; and
a signal source, which is different from the first radar and the second radar, configured to transmit a synchronization signal to the first radar and the second radar via the network, wherein
$\tau_{1i}$ denotes time for transmitting the synchronization signal from the signal source to the first radar,
$\tau_{2j}$ denotes time for transmitting the synchronization signal from the signal source to the second radar, and
the foreign object detection system controls a delay time corresponding to $|\tau_{1i} - \tau_{2j}|$ to prevent an interference occurring due to input of a radar signal to the first radar, the radar signal being output from the second radar and reflected by a reflective object,
wherein the foreign object detection system further comprises:
a delay time change unit configured to change the delay time;
a changing target identifying unit configured to identify a measurement target whose position measured by the first radar changes when the delay time change unit changes the delay time; and
an interference determination unit configured to determine that the measurement target identified by the changing target identifying unit is the interference.

3. A foreign object detection system comprising:
a first radar;
a second radar connected to the first radar via a network; and
a signal source, which is different from the first radar and the second radar, configured to transmit a synchronization signal to the first radar and the second radar via the network, wherein $\tau_{1i}$ denotes time for transmitting the synchronization signal from the signal source to the first radar,
$\tau_{2j}$ denotes time for transmitting the synchronization signal from the signal source to the second radar, and the foreign object detection system controls a delay time corresponding to $|\tau_{1i}-\tau_{2j}|$ to prevent an interference occurring due to input of a radar signal to the first radar, the radar signal being output from the second radar and reflected by a reflective object, wherein the first radar and the second radar are pulse radars and satisfy the following formula (3):

$$t_{max} < \mathrm{mod}(\Delta\tau_{ij}, T) \tag{3},$$

where $t_{max}$ is equal to $2L_{max}/c$, $L_{max}$ denotes a maximum detection distance of the first radar and the second radar, c denotes a signal velocity, $\Delta\tau_{ij}$ is equal to $|\tau_{1i}-\tau_{2j}|$, and T denotes a period of the pulse radar.

4. A foreign object detection system comprising:

a first radar;

a second radar connected to the first radar via a network; and a signal source, which is different from the first radar and the second radar, configured to transmit a synchronization signal to the first radar and the second radar via the network, wherein $\tau_{1i}$ denotes time for transmitting the synchronization signal from the signal source to the first radar, $\tau_{2j}$ denotes time for transmitting the synchronization signal from the signal source to the second radar, and the foreign object detection system controls a delay time corresponding to $|\tau_{1i}-\tau_{2j}|$ to prevent an interference occurring due to input of a radar signal to the first radar, the radar signal being output from the second radar and reflected by a reflective object, wherein the first radar and the second radar are FMCW radars whose frequencies change in a triangular wave shape with respect to time, and satisfy the following formula (4):

$$f_{max} < (2f_B \times \mathrm{mod}(\Delta\tau_{ij}, T))/T < 2f_B - f_{max} \tag{4},$$

where $f_{max}$ denotes an upper limit frequency (Hz) of an IF band circuit of the FMCW radar, $f_B$ denotes a frequency sweep width (Hz) of the FMCW radar, $\Delta\tau_{ij}$ is equal to $|\tau_{1i}-\tau_{2j}|$, and T denotes a period of the FMCW radar.

5. A foreign object detection system comprising:

a first radar;

a second radar connected to the first radar via a network; and a signal source, which is different from the first radar and the second radar, configured to transmit a synchronization signal to the first radar and the second radar via the network, wherein $\tau_{1i}$ denotes time for transmitting the synchronization signal from the signal source to the first radar, $\tau_{2j}$ denotes time for transmitting the synchronization signal from the signal source to the second radar, and the foreign object detection system controls a delay time corresponding to $|\tau_{1i}-\tau_{2j}|$ to prevent an interference occurring due to input of a radar signal to the first radar, the radar signal being output from the second radar and reflected by a reflective object wherein the first radar and the second radar are FMCW radars whose frequencies change in a saw tooth shape with respect to time, and satisfy the following formula (5):

$$f_{max} < (f_B \times \mathrm{mod}(\Delta\tau_{ij}, T))/T < f_B - f_{max} \tag{5},$$

where $f_{max}$ denotes an upper limit frequency (Hz) of the IF band circuit of the FMCW radar, $f_B$ denotes a frequency sweep width (Hz) of the FMCW radar, $\Delta\tau_{ij}$ is equal to $|\tau_{1i}-\tau_{2j}|$, and T denotes a period of the FMCW radar.

\* \* \* \* \*